May 19, 1931. C. T. SIEBS 1,806,121
METHOD OF AND APPARATUS FOR WELDING
Filed May 22, 1926 2 Sheets-Sheet 2
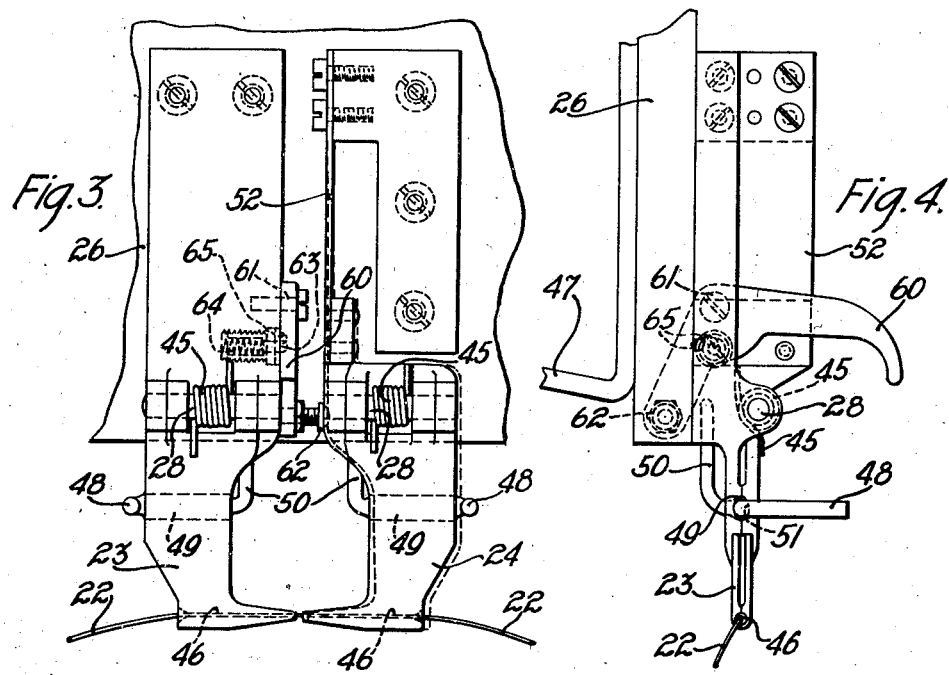
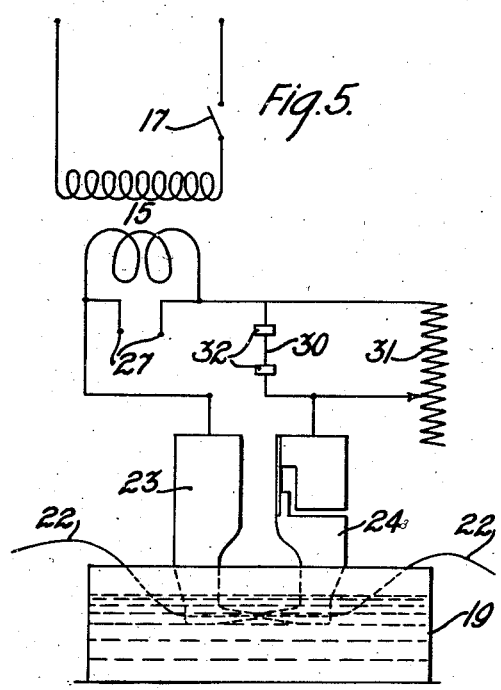
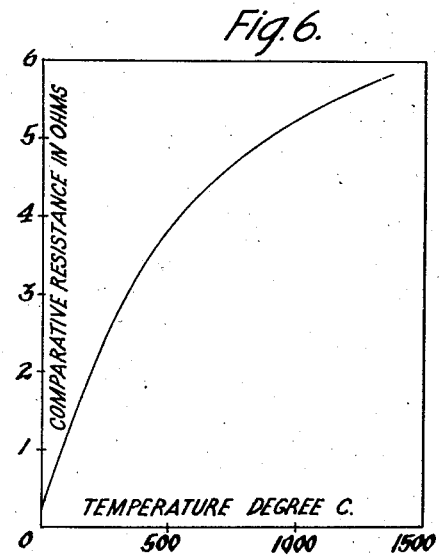
Inventor
Claude T. Siebs
by *Ha Tatham*
Att'y.

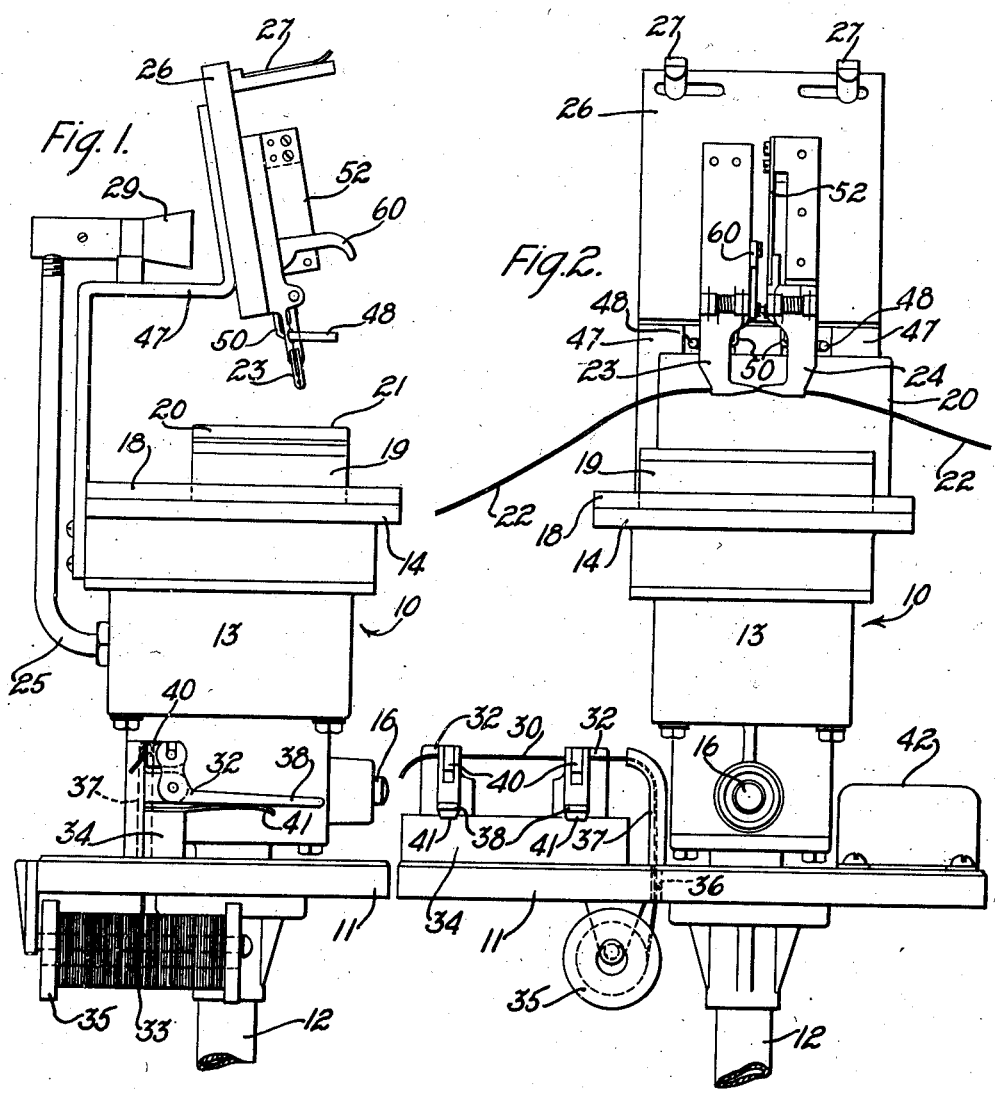

Patented May 19, 1931

1,806,121

UNITED STATES PATENT OFFICE

CLAUDE THEODORE SIEBS, OF RIVERSIDE, ILLINOIS, ASSIGNOR TO WESTERN ELECTRIC COMPANY, INCORPORATED, OF NEW YORK, N. Y., A CORPORATION OF NEW YORK

METHOD OF AND APPARATUS FOR WELDING

Application filed May 22, 1926. Serial No. 110,888.

This invention relates to a method of and an apparatus for welding, and more particularly to a method of and an apparatus for butt welding of wires or other materials electrically in which a smooth, uniform and strong weld is highly desirable.

Objects of the invention are to provide a method and apparatus which will produce welds of uniform quality having as great strength as the material being welded and having substantially the same cross-section.

Other objects of the invention are to provide a method of and an apparatus for welding materials, such as nickel-chrome alloys, which when exposed to the atmosphere while heated are readily oxidized producing a weak joint or completely preventing a union of the material.

Experience has shown that in order to get a good weld a high degree of precision in the control of the heat supply is required to reduce the time during which the metals are exposed to high temperatures. It appears that when metals are exposed to high temperatures certain chemical and physical reactions take place which injuriously affect the qualities of the weld in a degree which bears a definite relation to the time during which they are held at the high temperature. It is therefore desirable to complete the welding operation in the least possible time. In accordance with one embodiment of this invention, a large amount of heat is initially supplied to the parts to be welded to effect a quick temperature rise and as the desired temperature is approached the supply of heat is gradually reduced, and when a predetermined temperature is attained the supply of heat is sharply reduced so that the parts will be retained at the maximum temperature only momentarily. The supply of heat may then be wholly interrupted or retained at such a value as to produce an annealing effect on the parts after which it is interrupted. In accordance with one embodiment of the invention, an element having a high positive temperature coefficient such as a length of nickel wire of proper size is included in the welding circuit. The length of nickel wire allows a large initial flow of current to the parts to be welded and as temperature of the nickel wire increases, the resistance thereof will rapidly increase due to the high positive temperature coefficient of this metal thus reducing the current, and after the current has flowed at a given rate for a predetermined time the nickel wire will fuse and open the welding circuit. During the time that the material to be welded is subjected to heat it is immersed in a non-oxidizing fluid such as paraldehyde, heptaldehyde, or carbon tetrachloride to prevent oxidation and overheating of the material.

It is believed that a better understanding of the invention may be had by reference to the following description taken in conjunction with the accompanying drawings, in which Fig. 1 is a side elevation of a welding apparatus embodying one form of the invention and by means of which the method may be practiced;

Fig. 2 is a front elevation of the apparatus shown in Fig. 1;

Fig. 3 is a detail front elevational view of the jaws of the welding apparatus;

Fig. 4 is a side elevation of the jaws shown in Fig. 3;

Fig. 5 is a diagrammatic view of the welding circuit, and

Fig. 6 is a comparative temperature-resistance graph of a commercially pure nickel wire in which the abscissas indicate temperature and the ordinates resistance.

Referring to the drawings in which similar reference characters designate the same parts in the various views, the welding apparatus is indicated generally by the numeral 10 and is mounted on a base 11 which is supported by a stand or pedestal 12. A casing 13 extends from the base 11 to a flat portion or shelf 14 and is adapted to house a transformer 15, a push button 16 being mounted in the casing to operate a switch 17 in the primary circuit of the transformer. One of the terminals of the secondary of the transformer leads directly to a welding jaw 23 while the other terminal leads to a nickel fuse 30 and a variable resistance or rheostat 31 in parallel therewith before reaching a second welding jaw 24. The terminals of the secondary also lead to two annealing terminals 27—27 in which the wires are annealed after being welded.

The purpose of the rheostat in parallel with the nickel fuse is to permit the adjustment of the circuit to obtain the desired temperature-resistance characteristic of the circuit. The variation of the resistance of the rheostat due to temperature is practically negligible and, therefore, the combination of the rheostat and the nickel fuse in parallel will produce any desired characteristic within the limits of the two elements. When the rheostat is once set it need not be altered even though the fuse wire diameter is increased for increased sizes of wire to be welded. The rheostat is housed under a hood 42 and when it has been set, the hood is fastened to the base 11 by screws in order to maintain the desired adjustment against accidental displacement and its adjustment being altered by the operator.

An insulating block 34 is mounted on the base 11 opposite the rheostat hood and serves to support two clamps 32—32 between which the nickel fuse is placed. On the under side of the base 11 a reel 35 of nickel wire 33 is carried, which passes from the reel through a hole 36 in the base and through a tube 37 to the clamps. Each clamp is provided with a lever arm 38, a downward pressure on which will open the jaws 40 of the clamp to allow the insertion of the nickel fuse wire 33 which is engaged by the jaws upon release of the arm due to the action of the spring 41.

The shelf on the top of the casing 13 is surrounded by a strip of material forming a raised edge 18 for the purpose of preventing a vessel 19 from being accidentally displaced from the table. The vessel 19 contains a non-oxidizing solution such as carbon tetrachloride and is provided with a lid 20 to prevent evaporation of the contents during the intervals between the welding operations. The top of the lid 20 has a polished or mirrored surface 21 to facilitate placing the wires 22 in the jaws 23 and 24 of the welding apparatus. Supported by an arm 25 which is attached to the casing 13 is an electric lamp 29 which is suitably connected to an electric circuit and which is positioned so as to direct light rays upon the back of the base plate 26 from where they are reflected on the polished surface 21.

The base plate 26 is supported on the casing by two arms 47 and serves to carry the welding jaws 23 and 24 and the annealing terminals 27—27. Each annealing terminal consists of a post of semi-circular cross-section with a spring on the flat side to clamp a wire therebetween for the purpose of annealing it after it has been welded. The distance between the terminals is made variable to vary the resistance included between them and thereby regulate the amount of current and the annealing temperature.

The welding jaws 23 and 24 (shown in detail in Figs. 3 and 4) comprise a fixed and a movable part and are adapted to open to permit the insertion of the wires 22 by mounting the movable part of each jaw on a pivot 28, the jaws being maintained in a closed position by springs 45. A diamond shaped groove 46 is provided between the fixed and movable part of each jaw to receive the wire to be welded. The opening of the jaws is accomplished through a lever 48 which has an oval portion 49 cooperating with similarly shaped grooves 51 so that upon a downward movement of the lever the mouth of the jaw will be spread. The lever is also provided with an extension 50 which is adapted to strike the base plate 26 upon a slight upward movement of the lever and permit only a limited spreading of the jaw members. In order to insert a wire in the jaw the lever is moved upwardly, the spreading of the members in this instance being just sufficient to slightly separate the jaw, so that the wire may be inserted into the groove of the jaw from the end. Otherwise it might be difficult to get a flexible wire of small cross-section to lie properly in the groove. When the weld is complete the wire is removed from the jaws by completely opening them through a downward movement of the lever.

The jaw 23 is rigidly mounted on the base plate 26 while the jaw 24 is attached to a flat spring 52 to permit the latter to move to the dotted line position shown in Fig. 3 upon the raising of a bell crank lever 60 which is pivoted at 61 on the fixed jaw. The lower end of the lever carries a screw 62 insulated from the lever, the round head of which acting as a cam engages the side of the jaw 24 when the lever is raised, forcing the jaw 24 away from the fixed jaw 23 to the position indicated by the dotted line in Fig. 3. The jaw 23 is provided with a plunger 63 which is urged by a spring 64 against the lever 60, which has two depressions 65 which are engaged by the plunger to hold the lever in either of two positions. To place the wires 22 in the welding jaws the lever 60 is first raised pushing the jaw 24 to its outermost position. The wires are then inserted in the jaws in such a manner that their ends abut and the lever 60 is then moved downward to release the jaw 24 and allow the spring 52 to exert a pressure on the abutting ends of the wires.

As an example in the process of welding, a .011 inch "permalloy" (nickel-iron) wire, a nickel fuse wire of .008 inches diameter is used in the welding circuit. The comparatively low resistance of such a fuse when cold will allow a large rush of current at the beginning of the welding operation quickly bringing the wires to a welding temperature. As the temperature of the fuse increases, its resistance is rapidly increased, on account of the high positive temperature coefficient of this metal, thus tapering or reducing the current to that which will produce an annealing temperature. After the current has flowed at a predetermined rate for a given time the nickel wire will fuse and open the welding circuit. By using a nickel fuse in this manner it is possible to supply a current of such magnitude as to raise the parts to a welding temperature within a very short time and thereby reduce the time during which the parts are exposed to the deleterious chemical and physical effects which appear to accompany high temperatures of long duration. The nickel fuse may be so chosen and the parallel resistance so adjusted that when the desired temperature is attained the fuse will interrupt the welding circuit or in certain instances where it is desirable, the nickel fuse may be so chosen and the resistance so adjusted as to reduce the temperature as soon as the weld is complete and maintain the temperature at an annealing temperature for a short interval before the welding circuit is interrupted. As indicated in the temperature-resistance graph of Fig. 6, the resistance of the nickel wire increases many times before the temperature reaches the fusing temperature of 1452° C. and when it does reach this temperature the nickel wire fuses without explosion such as takes places when iron or other metals having a high positive temperature coefficient are used. Nickel further has the advantage of being inexpensive and easily drawn to the sizes suitable for use in practicing the invention, particularly with small welding sizes of wire.

The fuse is placed in the welding circuit by drawing a small length of it from the reel under the base and clamping it between the jaws 32—32. When the fuse is in position the wires to be welded are placed in the welding jaws, which operation is facilitated by the fact that the somewhat dark wire is plainly visible against the light background of the polished illuminated lid 20. The wire having been located in the jaws the lid 20 is removed and the vessel 19 is raised until the welding jaws and the portions of the wires to be welded are submerged in the carbon tetrachloride solution contained in the vessel 19. The button 16 is then pressed closing the primary circuit of the transformer and causing a large rush of current through the secondary winding thereof. The carbon tetrachloride solution in which the wires are immersed is a poor conductor of both electricity and heat and when a material is immersed therein and heated to the temperatures attained in welding only a small portion of the liquid immediately surrounding the heated portion is raised to a boiling temperature and formed into a gas.

When the wires to be welded have attained the welding temperature the current will have been greatly reduced as pointed out above and the heat of vaporization incident to the formation of the gas absorbs sufficient heat from the material to chill the exterior of the weld, thereby preventing an enlargement at the weld and a restriction at either side of it, which are well known phenomena encountered in the but welding of wires and are perhaps due to the tendency of a liquid to assume a spherical shape. The absorption of heat also assists in reducing the temperature of the wires to an annealing temperature before the nickel fuses, for the welding temperature is required only momentarily and the danger of overheating and burning the weld is thereby obviated. The odor of the carbon tetrachloride gas is not unpleasant and is harmless.

As soon as the nickel wire fuses the button 16 is released, the vessel 19 is returned to the table, the welded wire removed from the welding jaws and placed between the annealing terminals. The button 16 is again pressed until the wire attains a dark red glow, is then released and the wire removed, the weld being complete.

Annealing the wire for some distance on either side of the weld is desirable because the material in the weld may be hardened by the welding process and if it is attempted to bend the welded wire, the bending may all occur in the softer metal adjoining the weld. By slowly annealing a longer portion of the wire the variation in hardness along the wire is gradual and there will be no tendency for the wire to break on account of sharp bending at a junction of hard and soft metal.

It will be understood that the embodiment of the invention herein described and illustrated is merely a convenient and useful form of the invention, which is capable of many other modifications without departing from the spirit and scope of the invention.

What is claimed is:

1. A method of welding and annealing, which consists of immersing the parts to be welded in a fluid to prevent oxidation and to aid in maintaining an annealing temperature, passing an electrical current through the parts to bring them to a welding temperature, and decreasing the current to prevent the temperature from exceeding a predetermined value and to anneal the parts.

2. A method of welding and annealing, which consists of immersing the parts to be welded in a solution of carbon tetrachloride to prevent oxidation and to aid in maintaining an annealing temperature, passing an electrical current through the parts to raise them to the desired temperature, and decreasing the current to prevent the temperature from exceeding a definite value and to anneal the parts.

3. A method of welding and annealing, which consists of immersing the parts to be welded in a solution of carbon tetrachloride to prevent oxidation and to aid in maintaining an annealing temperature, passing an electrical current through the parts to raise them to the desired temperature, decreasing the current to prevent the temperature from exceeding a definite value and to anneal the parts, and then interrupting the flow of current through the parts.

4. A method of welding and annealing, which consists of placing the parts to be welded in a welding circuit, immersing the parts in a fluid to prevent oxidation and to aid in maintaining an annealing temperature, passing an electrical current through the circuit and adding resistance to the circuit to decrease the current and prevent the temperature from exceeding a predetermined value, and to anneal the parts.

5. In an electric welding apparatus, a welding circuit comprising a fuse having a positive temperature coefficient and adapted to break the welding circuit in response to predetermined conditions, and a variable resistance in parallel with the fuse to determine the conditions.

6. An electric welding apparatus comprising a welding circuit, means for causing a current to flow in the welding circuit to produce a welding temperature in the parts being welded, and a nickel fuse in the welding circuit to allow a large initial flow of current and gradually decrease the current to prevent the welding temperature from exceeding a predetermined value.

7. An electrical welding apparatus comprising a welding jaw, means for opening the jaw to insert the part to be welded, and means to facilitate the insertion of the part comprising a polished surface and a source of illumination for said surface.

8. A welding apparatus comprising a welding jaw to hold the material to be welded, and means movable in one direction an amount sufficient to open the jaw far enough to insert the material and in another direction to completely open the jaw to remove the material.

9. A welding apparatus comprising a welding circuit, means for causing an electrical current to flow in the circuit to produce a weld, and common means for automatically decreasing the rate of current flow in the circuit to that which will produce an annealing temperature and for opening the circuit when the rate of current flow has decreased to a predetermined value.

10. A welding apparatus comprising a welding circuit, means for causing an electrical current to flow in the welding circuit, and means responsive to the heating effect of the current for decreasing the current in the welding circuit to that which will produce an annealing temperature and interrupting the current when it has decreased to a predetermined value.

11. In an electric welding apparatus, a welding circuit comprising a fusing means for interrupting the welding circuit when the current in the circuit has reached a predetermined value, and means for controlling the value of current at which the circuit is interrupted.

In witness whereof, I hereunto subscribe my name this eighth day of May A. D., 1926.

CLAUDE THEODORE SIEBS.